United States Patent
Cinotti et al.

(10) Patent No.: US 6,907,716 B2
(45) Date of Patent: Jun. 21, 2005

(54) PACKAGING MACHINE FOR WRAPPING PRODUCTS IN RESPECTIVE SHEETS OF HEAT-SEAL WRAPPING MATERIAL

(75) Inventors: Andrea Cinotti, Bologna (IT); Giordano Gorrieri, Pianoro (IT)

(73) Assignee: KPL Packaging S.p.A., Casalecchio di Reno (IT)

( * ) Notice: Subject to any disclaimer, the term of this patent is extended or adjusted under 35 U.S.C. 154(b) by 0 days.

(21) Appl. No.: 10/767,535

(22) Filed: Jan. 29, 2004

(65) Prior Publication Data

US 2004/0226269 A1 Nov. 18, 2004

(30) Foreign Application Priority Data

Jan. 31, 2003 (EP) ............................................. 03425052

(51) Int. Cl.[7] ............................. B65B 9/10; B65B 51/30
(52) U.S. Cl. ........................ 53/550; 53/374.6; 53/371.6
(58) Field of Search ............................... 53/371.6, 550, 53/371.5, 374.5, 374.6

(56) References Cited

U.S. PATENT DOCUMENTS

| 4,546,595 A | * | 10/1985 | Yasumune et al. ............ 53/550 |
| 4,702,060 A | * | 10/1987 | Reid .......................... 53/374.5 |
| 4,905,446 A | * | 3/1990 | Dieckbernd et al. ....... 53/374.6 |
| 5,433,063 A | | 7/1995 | Kovacs et al. |
| 6,408,600 B1 | * | 6/2002 | Nankervis et al. ............ 53/477 |

FOREIGN PATENT DOCUMENTS

| DE | 10020324 | 4/2000 |
| EP | 1157930 | 4/2001 |

* cited by examiner

Primary Examiner—John Sipos
(74) Attorney, Agent, or Firm—Fay, Sharpe, Fagan, Minnich & McKee, LLP

(57) ABSTRACT

A packaging machine has a wrapping device for forming a tubular wrapping from a continuous web of heat-seal material, and for feeding products successively into the tubular wrapping; each product being located between two free tubular portions of the tubular wrapping, which are folded substantially onto the relative products, and are stabilized by means of at least two pairs of sealing devices fed along relative paths with independent laws of motion.

13 Claims, 4 Drawing Sheets

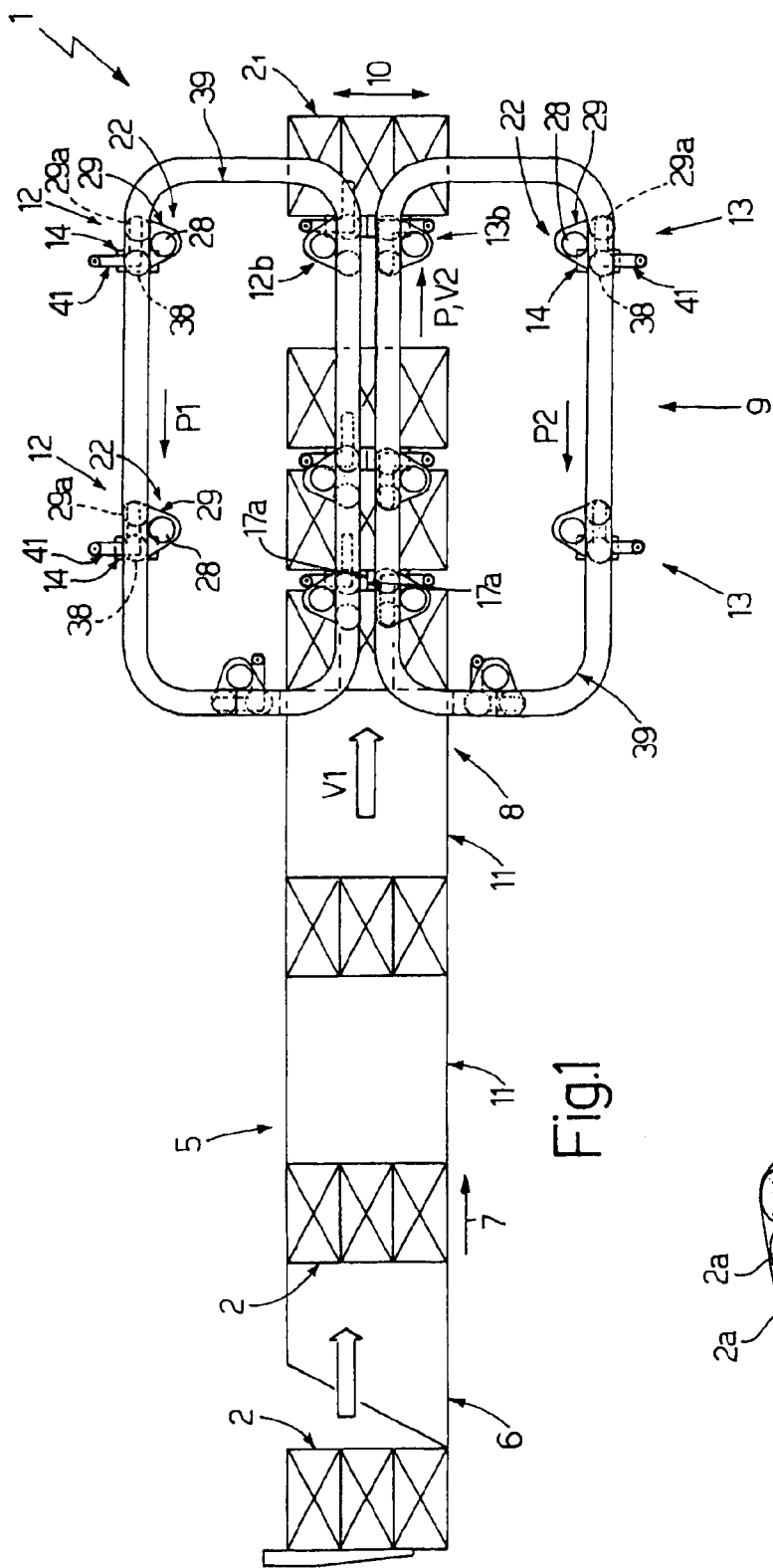
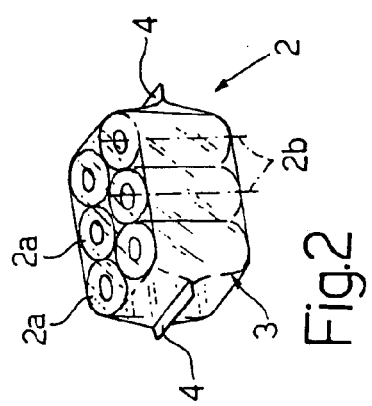
Fig.1
Fig.2

PACKAGING MACHINE FOR WRAPPING PRODUCTS IN RESPECTIVE SHEETS OF HEAT-SEAL WRAPPING MATERIAL

The present invention relates to a packaging machine for wrapping products in respective sheets of heat-seal wrapping material.

More specifically, the present invention relates to a packaging machine for wrapping products, each defined by one or more articles. In the following description, the articles considered are groups of rolls of paper, to which the following description refers purely by way of example.

BACKGROUND OF THE INVENTION

Known machines for packaging rolls of paper, and of the type described, for example, in U.S. Pat. No. 5,433,063, normally comprise a wrapping unit for forming a tubular wrapping from a continuous web of heat-seal material; feeding groups of rolls of paper successively into the tubular wrapping, so that each group is located between two free tubular portions of the tubular wrapping; and transferring the tubular wrapping and the groups to a sealing station at a first constant travelling speed.

The sealing station comprises at least two sealing units, each of which comprises at least two sealing bars moving in time with each other along a substantially horizontal sealing path to feed a group of rolls of paper along the sealing path and seal a said free tubular portion.

The sealing bars of each sealing unit are mounted on two respective pairs of belt conveyors, which are located on opposite sides of the sealing path, in a substantially vertical direction crosswise to the sealing path, and which form part of a relative actuating device also comprising an electric motor common to all the belt conveyors of the actuating device.

Each electric motor is operated independently of the electric motors of the other sealing units to feed the relative sealing bars, and hence the relative groups of rolls of paper, along the sealing path at a second travelling speed, which is variable so that, by combining the first and second travelling speed, each free tubular portion is folded substantially onto the relative groups of rolls of paper.

Since the output rate is proportional to the number of sealing units employed, known packaging machines of the type described above are equipped with a relatively large number of sealing units, and consequently also with a relatively large number of belt conveyors, which make them relatively complex and expensive.

SUMMARY OF THE INVENTION

It is an object of the present invention to provide a packaging machine for wrapping products in respective sheets of heat-seal wrapping material, designed to eliminate the aforementioned drawbacks.

According to the present invention, there is provided a packaging machine for wrapping products in respective sheets of heat-seal wrapping material, the machine comprising wrapping means for forming a tubular wrapping from a continuous web of heat-seal material, and for feeding products successively into the tubular wrapping, each product being located between two free tubular portions of said tubular wrapping; and sealing and feed means comprising at least two pairs of sealing devices, the sealing devices in each pair of sealing devices being movable along a sealing path to feed a respective said product along the sealing path at a variable travelling speed, and perform a respective sealing operation on a respective said tubular portion; and being characterized by comprising actuating means for advancing said sealing devices with respective independent laws of motion.

BRIEF DESCRIPTION OF THE DRAWINGS

A non-limiting embodiment of the present invention will be described by way of example with reference to the accompanying drawings, in which:

FIG. 1 shows a schematic side view of a preferred embodiment of the packaging machine according to the present invention;

FIG. 2 shows a schematic view in perspective of a first detail in FIG. 1;

DETAILED DESCRIPTION OF THE INVENTION

Figure 3:
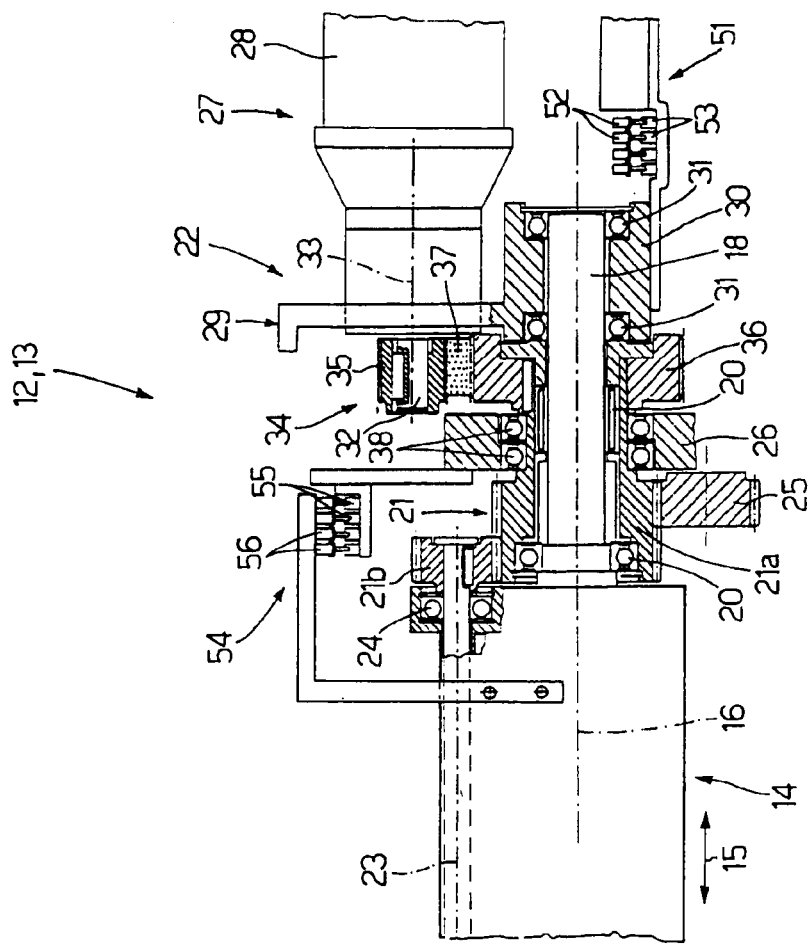
FIG. 3 shows a schematic side view, with parts in section and parts removed for clarity, of a second detail in FIG. 1.
Figure 3:
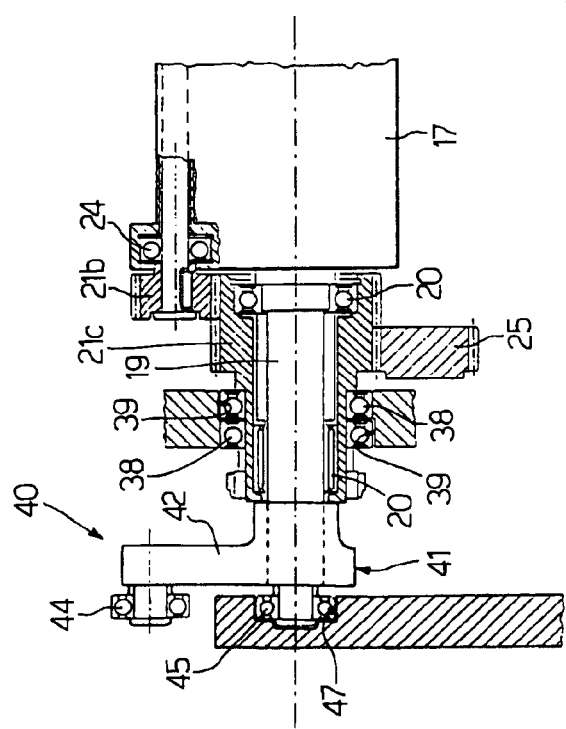

With reference to FIGS. 1 and 2, number 1 indicates as a whole a packaging machine for wrapping products 2 in respective sheets 3 of transparent heat-seal material, each of which, in the finished configuration of the respective wrapped product 2, is folded about and substantially onto respective product 2, and is stabilized by a longitudinal side seal along a longitudinal overlap portion (not shown) of sheet 3, and by two end seals at respective transverse overlap portions 4 of sheet 3.

As shown in FIG. 2, each product 2 is defined by six rolls of paper 2a arranged with their longitudinal axes 2b parallel. Obviously, in alternative embodiments not shown, rolls 2a defining each product 2 are other than six in number and arranged otherwise than as shown in FIG. 2.

Machine 1 comprises a known wrapping unit 5 for forming a tubular wrapping 6 from a continuous web of transparent heat-seal material (not shown); stabilizing wrapping 6 by a longitudinal side seal along a longitudinal overlap portion (not shown) of wrapping 6; feeding products 2 successively inside wrapping 6; and feeding wrapping 6 and products 2 in a substantially horizontal direction 7 and at a substantially constant travelling speed V1 to an input station 8 of a sealing unit 9.

Products 2 are positioned inside wrapping 6 with their axes 2b parallel to a substantially vertical direction 10 crosswise to direction 7, and are equally spaced along wrapping 6 so that each product 2 is located between two free tubular portions 11 of wrapping 6. Each portion 11 is of a length, measured parallel to direction 7, equal to the height of a product 2, measured parallel to direction 10, plus twice the length of an overlap portion 4 measured parallel to direction 7.

Unit 9 comprises a number of—in the example shown, six—top sealing devices 12 movable along an endless path P1 extending in a substantially vertical plane; and a number of bottom sealing devices 13, which are equal in number to devices 12, cooperate with corresponding devices 12, and are movable along an endless path P2 extending in the same plane as path P1, and having a horizontal portion in common with path P1 and defining a sealing path P.

With reference to FIG. 3, each device 12, 13 comprises a sealing bar 14, which extends in a direction 15 crosswise to relative path P1, P2, has a longitudinal axis 16 parallel to direction 15, and comprises a substantially parallelepiped-shaped, substantially rectangular-section central portion 17 having a heated flat surface 17a of a width, measured parallel to path P, substantially equal to twice the length of an overlap portion 4 also measured parallel to path P (FIGS. 1 and 2).

Bar 14 also comprises two substantially cylindrical end pins 18 and 19, which are located on opposite sides of portion 17 in direction 15, are coaxial with axis 16, and respectively engage, in rotary and axially fixed manner, via the interposition of respective pairs of rolling bearings 20, an input gear 21a and an output gear 21c of a gear train 21, which, in the example shown, comprises three gears 21a, 21b, 21c, and forms part of a carriage 22 for conveying bar 14 along relative path P1, P2.

The intermediate gear 21b is located between gears 21a and 21c, has a longitudinal axis 23 substantially parallel to axis 16, and is engaged in rotary and axially fixed manner, through portion 17 and via the interposition of a pair of rolling bearings 24, to rotate, with respect to portion 17, about axis 23.

Gears 21a and 21c mesh with respective racks 25 fitted to a fixed frame 26 of machine 1 and extending along relative path P1, P2, and are rotated about axis 16 to move carriage 22, and therefore bar 14, along relative path P1, P2 by means of an actuating device 27 comprising an electric motor 28 fixed to a substantially flat portion of a supporting member 29. Member 29 forms part of carriage 22, and also comprises a sleeve 30 coaxial with axis 16 and engaged in rotary and axially fixed manner by pin 18 with the interposition of a pair of rolling bearings 31.

Motor 28 has an output shaft 32 mounted to rotate about a substantially longitudinal axis 33 parallel to axis 16, and which is connected to gear 21a by a belt drive 34 forming part of device 27, and comprising a pulley 35 fitted to shaft 32 and coaxial with axis 33, a pulley 36 fitted to gear 21a and coaxial with axis 16, and a belt 37 looped about pulleys 35 and 36.

To control the position of carriage 22, and therefore of bar 14, crosswise to relative path P1, P2, each gear 21a, 21c supports a pair of rolling bearings 38, each of which is fitted to relative gear 21a, 21c coaxially with axis 16, and engages a relative race 39 formed through frame 26, extending parallel to relative path P1, P2, and of a height, measured crosswise to relative path P1, P2, greater than the outside diameter of relative bearing 38. On account of the difference in the size of bearings 38 and relative races 39, each bearing 38 contacts only one side of relative race 39, and so moves along relative path P1, P2 with a rotary-translational motion.

To control the angular position of member 29 about axis 16, member 29 has a supporting pin (not shown) extending in direction 15 and supporting a pair of rolling bearings 29a (FIG. 1), which engage the races 39 of gear 21a to prevent member 29 from rotating about axis 16.

The angular position of bar 14 and, therefore, of surface 17a about axis 16 and with respect to carriage 22 is controlled by an orienting device 40 for keeping surface 17a substantially parallel to relative path P1, P2 at least along sealing path P.

With reference to FIGS. 1 and 3, device 40 comprises a rocker arm 41 fitted to a free end of pin 19, coaxially with axis 16, and having two arms 42, 43, each of which extends radially outwards from pin 19, and is fitted on a free end with a tappet roller 44, 45, which is mounted for rotation on relative arm 42, 43, and engages a relative fixed cam 46, 47 (FIG. 4) for controlling the angular position of rocker arm 41 and, therefore, of bar 14 about axis 16, and for oscillating bar 14 about axis 16 according to a given law.

Figure 4:
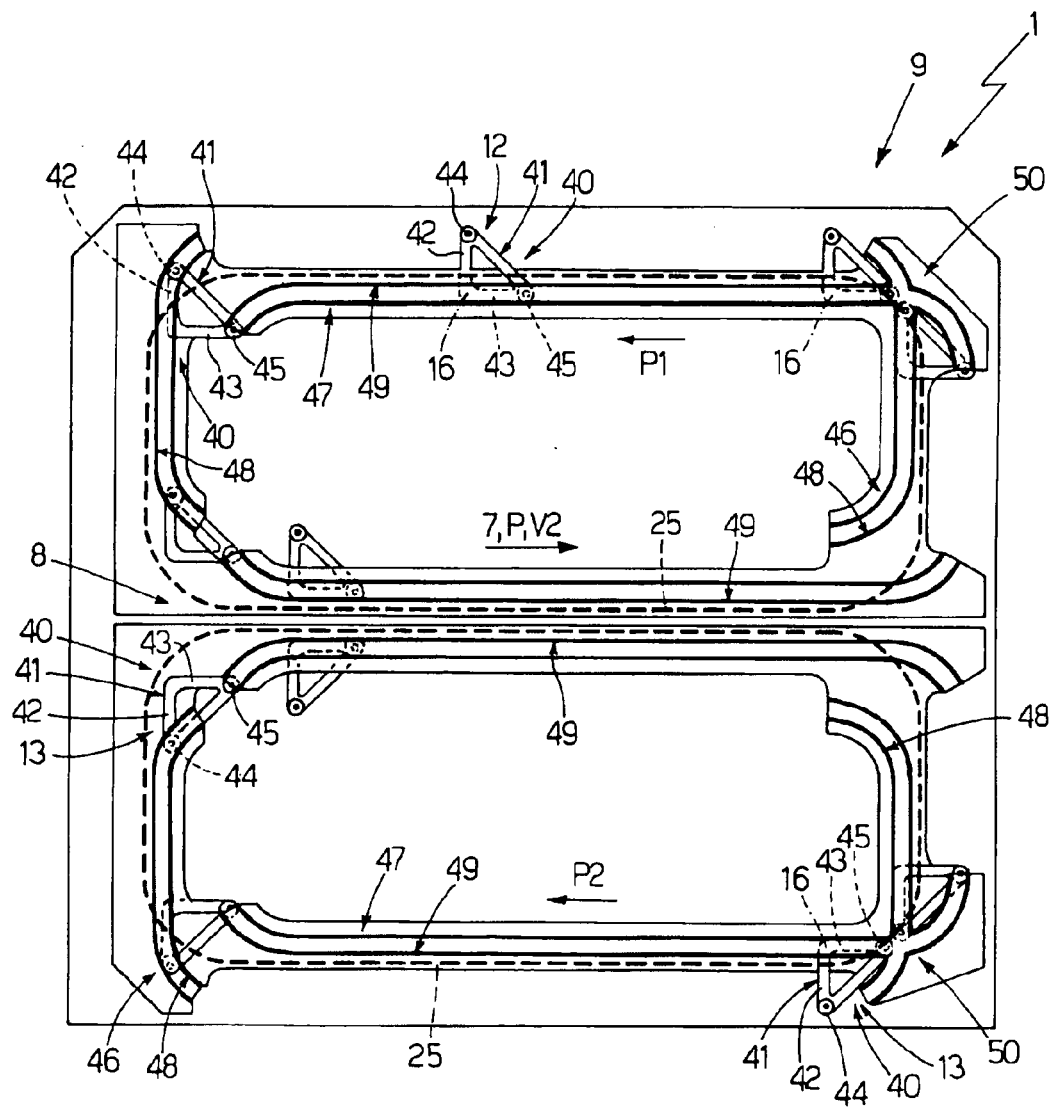
FIG. 4 shows a schematic side view, with parts removed for clarity, of a third detail in FIG. 1.

As shown in FIG. 4, each cam 46, 47 comprises two separate portions 48, 49, which are located, with respect to portions 48, 49 of the other cam 46, 47, so that, along the straight portions of paths P1, P2, only one tappet roller 44, 45 engages relative cam 46, 47, i.e. the roller 44, 45 aligned with axis 16 in the travelling direction of sealing devices 12, 13 along relative paths P1, P2.

In connection with the above, it should be pointed out that, at one of the curved portions of each path P1, P2, relative cams 46, 47 have an intersection portion 50 where the angular position of each rocker arm 41 about axis 16 is controlled by a relative third tappet roller (not shown) engaging a third cam (not shown).

With reference to FIG. 3, electric motors 28 are powered by a power device 51 with sliding electric contacts, and which comprises a number of guides 52 of conducting material fitted to frame 26 and normally common to all of motors 28; and, for each motor 28, a number of brushes 53 also made of conducting material, and which are fitted to relative carriage 22, are equal in number to guides 52, and engage relative guides 52 in sliding manner as relative sealing device 12, 13 travels along relative path P1, P2.

Sealing bars 14 and, therefore, relative surfaces 17a are powered by a power device 54 with sliding electric contacts, and which comprises a number of guides 55 of conducting material fitted to frame 26 and normally common to all of bars 14; and, for each bar 14, a number of brushes 56 also made of conducting material, and which are fitted to relative bar 14, are equal in number to guides 55, and engage relative guides 55 in sliding manner as relative sealing device 12, 13 travels along relative path P1, P2.

It should be pointed out that devices 51 and 54 are also used to connect sealing devices 12, 13 to an electronic central control unit (not shown) for selectively controlling the position of carriages 22 along relative paths P1, P2, and the operating mode of bars 14.

Sealing devices 12, 13 therefore have respective actuating devices 27 controlled independently by said electronic central control unit (not shown), and which provide for moving sealing devices 12, 13 along relative paths P1, P2 with independent laws of motion.

Figure 5:
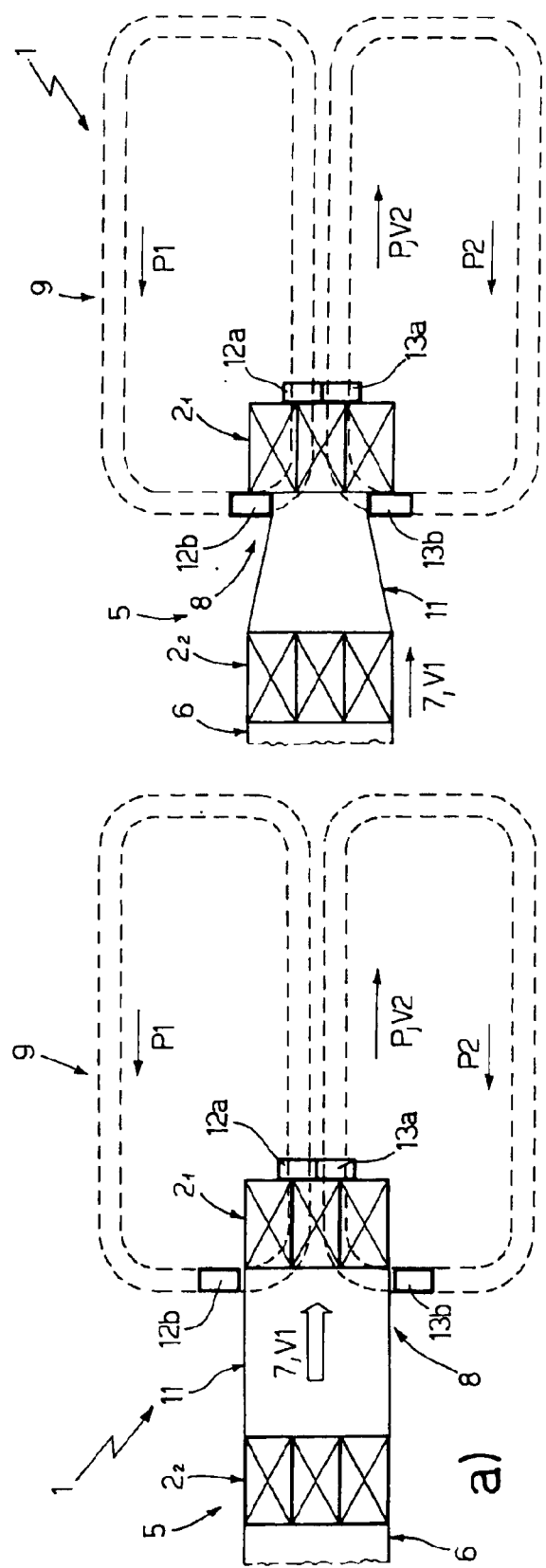
FIG. 5 shows a schematic side view of the operating principle of the FIG. 1 packaging machine.
Figure 5:
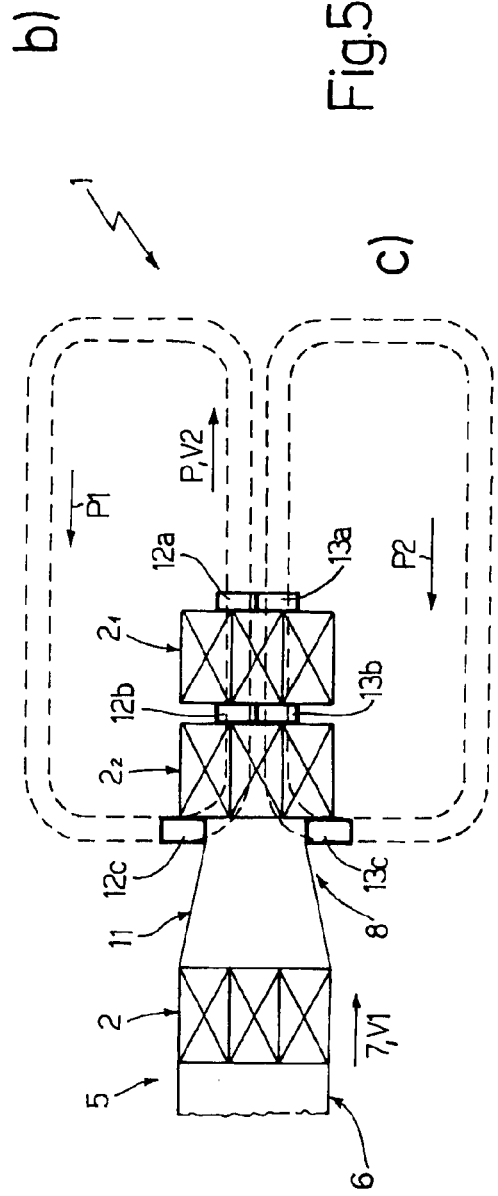

Operation of packaging machine 1 will now be described with reference to FIGS. 1 and 5, bearing in mind that each top sealing device 12 is fed at least along sealing path P in time with a corresponding bottom sealing device 13, and as of the instant in which, as shown in FIG. 5a, the leading end of tubular wrapping 6 has been folded substantially onto a first product 2 (hereinafter indicated $2_1$) to define one of relative overlap portions 4, and the same portion 4 has been stabilized by an end seal made by a first pair of devices 12, 13 (hereinafter indicated 12a, 13a) engaging the front of product $2_1$ in direction 7.

With reference to FIGS. 1 and 5b, the rear of product $2_1$ in direction 7 is engaged by another pair of devices 12, 13 (hereinafter indicated 12b, 13b) and fed along path P at a given travelling speed V2, while wrapping 6 and the following products 2 are fed by wrapping unit 5 in direction 7 at speed V1. Along an initial portion of path P, speed V2 of devices 12b and 13b is so controlled as to be lower than speed V1, so that, by combining speed V2 of product $2_1$ with speed V1 of the next product 2 (hereinafter indicated $2_2$) entering unit 9, and with the movement of devices 12b and 13b along relative paths P1, P2, the tubular portion 11 between products $2_1$ and $2_2$ can be folded gradually onto products $2_1$ and $2_2$ to define relative overlap portions 4, and product $2_2$ can be moved into contact with devices 12*b*, 13*b*.

As shown in FIG. 5*c*, the rear of product $2_2$ in direction 7 is engaged by another pair of devices 12, 13 (hereinafter indicated 12*c*, 13*c*) so that, as products $2_1$ and $2_2$ travel along an intermediate portion of path P, the overlap portions 4 between products $2_1$ and $2_2$ are stabilized by devices 12*b*, 13*b*, and are also separated in known manner by a cutting member (not shown) housed in one of devices 12*b*, 13*b*, so as to cut sheet 3 of wrapping material of product $2_1$ off wrapping 6.

Finally, as shown in FIG. 1, along a final portion of path P, speed V2 is so controlled as to enable devices 12*b*, 13*b* to detach product $2_1$ from product $2_2$.

The above operating sequence relative to products $2_1$ and $2_2$ is then repeated for each new product 2 fed by wrapping unit 5 to input station 8 of sealing unit 9.

Tubular wrapping 6 and products 2 are therefore fed by wrapping unit 5 to input station 8 at a constant travelling speed V1, and products 2 are fed by sealing devices 12, 13 along sealing path P at a travelling speed V2 varying along path P.

What is claimed is:

1. A packaging machine for wrapping products in respective sheets of heat-seal wrapping material, the machine comprising wrapping means for forming a tubular wrapping from a continuous web of heat-seal material, and for feeding products successively into the tubular wrapping, each product being located between two free tubular portions of said tubular wrapping; and sealing and feed means comprising at least two pairs of sealing devices, the sealing devices in each pair of sealing devices being movable along a sealing path to feed a respective said product along the sealing path at a variable travelling speed, and perform a respective sealing operation on a respective said tubular portion; and actuating means for driving and moving each sealing device independently of the other sealing devices.

2. A packaging machine as claimed in claim 1, wherein said actuating means comprise an actuating device for each said sealing device; logic control means being provided to selectively control said actuating devices independently of each other.

3. A packaging machine as claimed in claim 1, wherein each sealing device has a heated surface; orienting means being provided to keep said heated surface substantially parallel to said sealing path along the sealing path itself.

4. A packaging machine as claimed in claim 3, wherein each sealing device comprises a carriage movable along said sealing path; and a sealing bar having said heated surface and connected to the carriage to oscillate, with respect to the carriage, about a relative axis and under the control of said orienting means.

5. A packaging machine as claimed in claim 4, wherein said orienting means comprise cam means; and at least one tappet carried by said sealing bar and cooperating with said cam means to control the angular position of the sealing bar about said axis.

6. A packaging machine as claimed in claim 4, further comprising two racks substantially parallel to each other and to said sealing path; the carriage comprising a gear train, in turn comprising an input gear and an output gear, each meshing with a relative said rack, and an intermediate gear interposed between the input gear and the output gear.

7. A packaging machine as claimed in claim 6, wherein said actuating means comprise, for each said carriage, an electric motor for operating the relative said input gear.

8. A packaging machine as claimed in claim 7, wherein said actuating means further comprise power means for supplying electric power to said electric motors; said power means being power means with sliding electric contacts.

9. A packaging machine as claimed in claim 8, wherein said power means with sliding electric contacts comprise at least one fixed first guide made of conducting material; and, for each said electric motor, at least one first sliding brush also made of conducting material, and which is carried by the relative electric motor and engages said first guide in sliding manner.

10. A packaging machine as claimed in claim 3, further comprising further power means for supplying electric power to said heated surfaces; said further power means being power means with sliding electric contacts.

11. A packaging machine as claimed in claim 10, wherein said further power means with sliding electric contacts comprise at least one fixed second guide made of conducting material; and, for each said heated surface, at least one second sliding brush also made of conducting material, and which is carried by the relative sealing device and engages said second guide in sliding manner.

12. A packaging machine as claimed in claim 1, further comprising at least one third guide extending along said sealing path; each sealing device having connecting means for connection to said third guide and for controlling the position of the sealing device in a direction crosswise to the sealing path.

13. A packaging machine as claimed in claim 12, wherein said connecting means comprise two connecting members mounted for rotation on the relative sealing device; the connecting members and the third guide being so formed that the connecting members move along the third guide with a rotary-translational motion.

* * * * *